United States Patent
Karsi

(10) Patent No.: US 11,071,059 B2
(45) Date of Patent: Jul. 20, 2021

(54) PREVENTING PEAK CURRENT DRAW IN A WIRELESS DEVICE

(71) Applicant: Tracie Wireless LLC, Burlington, MA (US)

(72) Inventor: Murat Karsi, San Diego, CA (US)

(73) Assignee: TRACIE WIRELESS LLC, Burlington, MA (US)

( * ) Notice: Subject to any disclaimer, the term of this patent is extended or adjusted under 35 U.S.C. 154(b) by 0 days.

(21) Appl. No.: 16/813,423

(22) Filed: Mar. 9, 2020

(65) Prior Publication Data

US 2020/0213944 A1 Jul. 2, 2020

Related U.S. Application Data

(63) Continuation of application No. 15/981,738, filed on May 16, 2018, now Pat. No. 10,588,083.

(60) Provisional application No. 62/508,254, filed on May 18, 2017.

(51) Int. Cl.
*H04W 52/02* (2009.01)
*H04L 12/805* (2013.01)
*H04L 5/00* (2006.01)

(52) U.S. Cl.
CPC ....... *H04W 52/0222* (2013.01); *H04L 5/0044* (2013.01); *H04L 47/365* (2013.01)

(58) Field of Classification Search
CPC . H04W 52/0222; H04L 5/0044; H04L 47/365
See application file for complete search history.

(56) References Cited

U.S. PATENT DOCUMENTS

| | | | |
|---|---|---|---|
| 8,706,155 B1 | 4/2014 | Peon | |
| 2008/0161071 A1 | 7/2008 | Sherman | |
| 2008/0222431 A1 | 9/2008 | Paniagua et al. | |
| 2010/0034184 A1* | 2/2010 | Sato | H04L 12/66 370/338 |
| 2012/0106677 A1 | 2/2012 | Lee et al. | |
| 2012/0274280 A1 | 11/2012 | Yip et al. | |

(Continued)

FOREIGN PATENT DOCUMENTS

| | | |
|---|---|---|
| WO | 2009146132 A2 | 12/2009 |
| WO | 2016160753 A2 | 10/2016 |
| WO | 2017015705 A1 | 2/2017 |

OTHER PUBLICATIONS

International Search Report and Written Opinion issued in International Application No. PCT/US2018/033036, dated Aug. 3, 2018, in 14 pages.

*Primary Examiner* — Samina F Choudhry
(74) *Attorney, Agent, or Firm* — Procopio Cory Hargreaves and Savitch LLP; Pattric J. Rawlins; Jonathan D. Cheng

(57) ABSTRACT

Preventing peak current draw in a wireless device. In an embodiment, a data payload to be transmitted is segmented into data payload segment(s) based on the data payload size and a peak current rating of the wireless device's battery, such that each data payload segment has a segment size which is estimated to result, during transmission of the data payload segment, in a maximum current draw from the battery that is less than the peak current rating of the battery. Then, each data payload segment is transmitted, such that the transmission of one data payload segment does not overlap with the transmission of any other data payload segment.

14 Claims, 5 Drawing Sheets

(56) References Cited

U.S. PATENT DOCUMENTS

| | | |
|---|---|---|
| 2012/0286691 A1 | 11/2012 | Jesme |
| 2015/0080047 A1 | 3/2015 | Russell et al. |
| 2015/0382238 A1 | 12/2015 | Davis et al. |
| 2016/0112953 A1* | 4/2016 | Go .................. H04L 65/608 370/329 |
| 2016/0295516 A1 | 10/2016 | Su et al. |

* cited by examiner

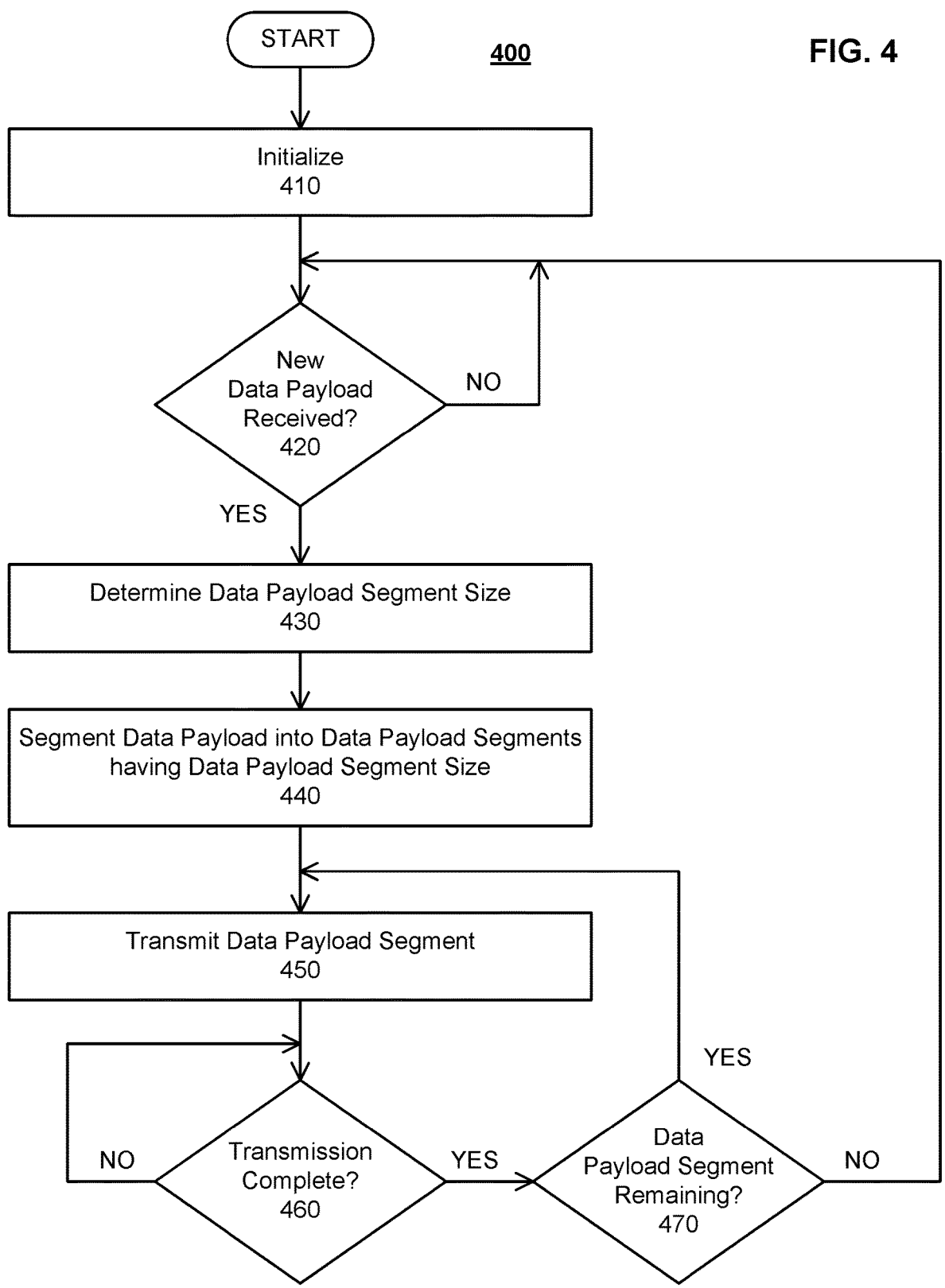

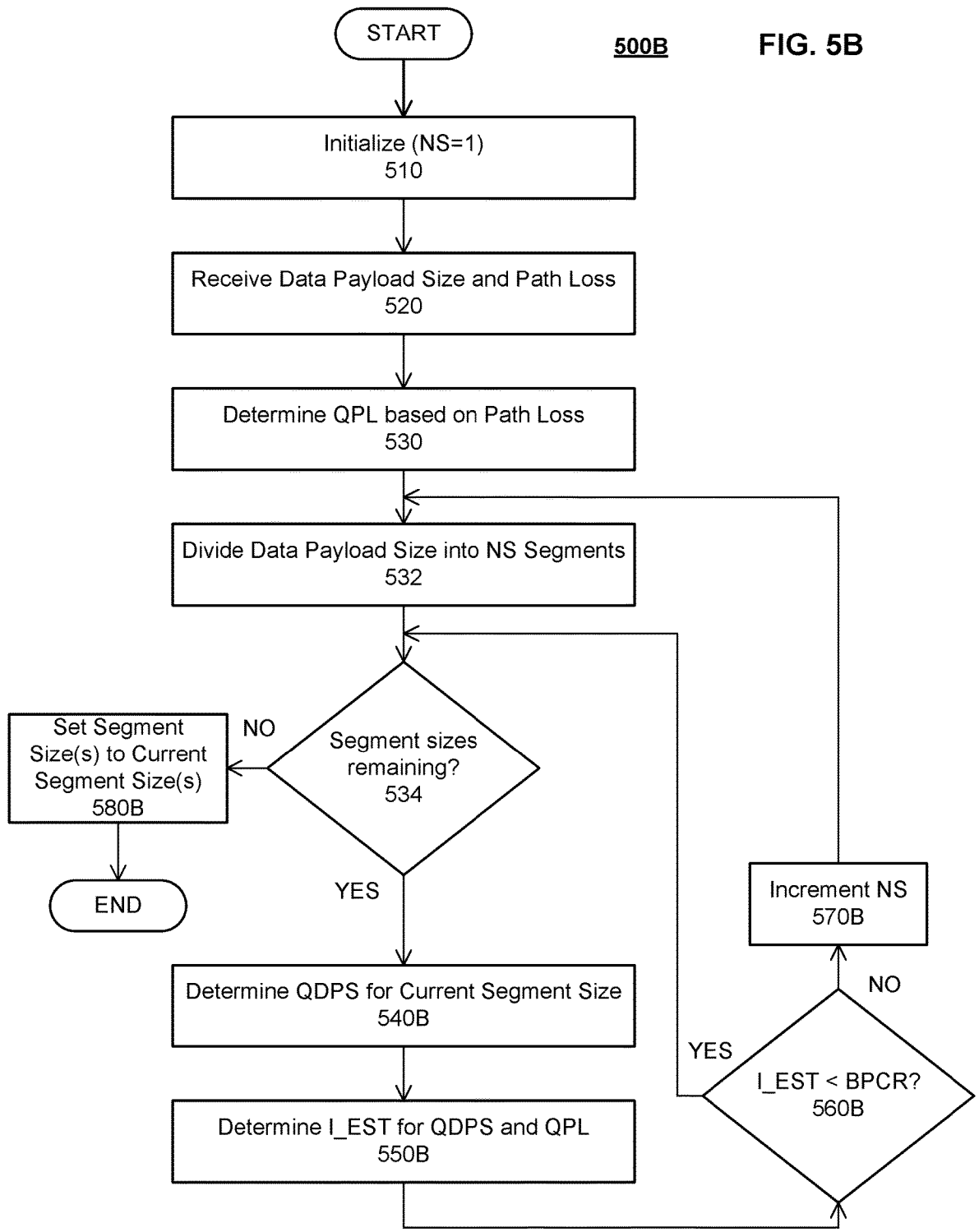

PREVENTING PEAK CURRENT DRAW IN A WIRELESS DEVICE

CROSS-REFERENCE TO RELATED APPLICATIONS

This application is a continuation of U.S. patent application Ser. No. 15/981,738, filed on May 16, 2018, which claims priority to U.S. Provisional Patent App. No. 62/508,254, filed on May 18, 2017, which are both hereby incorporated herein by reference as if set forth in full.

BACKGROUND

Field of the Invention

The embodiments described herein are generally directed to controlling peak current drain, and, more particularly, to sizing data packets so as to prevent peak current draw from a battery of a wireless device.

Description of the Related Art

Many devices that communicate via wireless means are operated by a battery. Such devices, include, without limitation, wireless cell phones, paging devices, position trackers that transmit and receive data according to a wireless standard, cellular communications devices operating according to 3rd Generation Partnership Project (3GPP) standards, user equipment (UE) operating according to 3GPP Long Term Evolution (LTE) standards, Bluetooth™ devices, Zigbee™ devices, wireless communication devices that communicate according to variants of the 802.11 family of standards, and/or the like. As used herein, the term "wireless device" is contemplated to include all such devices, as well as any other battery-operated device that communicates wirelessly.

Typically, wireless devices communicate with other wireless devices or wireless infrastructure ports. A wireless infrastructure port is a communications device that can wirelessly transmit data to a wireless device and wirelessly receive data from a wireless device, and act as a connection point to a communications network. Examples of wireless infrastructure ports include access points that communicate according to the 802.11 family of standards, cellular base stations, 3GPP LTE eNodeBs, Bluetooth™ devices, Zigbee™ devices, cellular repeaters, range extenders, and the like.

A wireless device's transmission power (i.e., the power used to transmit a data signal) is a key aspect of the wireless device. In fact, the transmission mode in a battery-operated wireless device is typically the communications mode that draws the highest current from the wireless device's battery. This is mainly due to large current draws from the battery by the power amplifiers in the wireless device. If not controlled, these large current draws may quickly deplete the wireless device's battery.

In typical communications scenarios, the transmission power is determined by the link conditions between the transmitting entity (e.g., wireless device) and the receiving entity (e.g., wireless infrastructure port). For example, the transmission power may be chosen as the minimum power required to accomplish a certain link quality for the given link conditions. Many communications systems use techniques to adapt the transmission power, so as to minimize the amount of transmission power used for the given link conditions.

Many wireless devices today are designed with a goal of having a small form factor. For example, small form factors are typical in Internet-of-Things (IoT) gadgets and devices which use the Global Positioning System (GPS) for location determinations and cellular techniques for communications with other devices. Reducing the size of such devices to achieve a small form factor frequently involves utilizing a battery with a small form factor.

One key performance metric for a battery is its capacity. Capacity is typically measured in units of amp-hour or milliamp-hour. A battery with a capacity of one amp-hour should be able to continuously supply a current of one amp to a load for exactly one hour, two amps for one-half hour, one-third amp for three hours, and so on, before becoming completely discharged. In an ideal battery, this relationship between continuous current and discharge time is stable and absolute. However, real batteries do not behave exactly as this simple linear formula might indicate. Therefore, when amp-hour capacity is given for a battery, it is specified for either a given current or a given time, or it is assumed to be rated for a time period of eight hours (if no limiting factor is given).

Another key performance metric for a battery is its peak current rating. The current drawn from the battery by the wireless device should be maintained below the peak current rating. If the wireless device draws more current from the battery than specified by the peak current rating, the anticipated performance of the battery may be adversely affected, for example, due to impairment of internal circuits within the battery. For instance, the capacity of the battery may be reduced, which can, in turn, reduce the battery's life. In other words, a battery that supplies current above its peak current rating may have a smaller battery life than a battery which only supplies current below its peak current rating.

For the reasons above, the life of a battery can be improved by ensuring that the maximum current drawn from the battery remains below the peak current rating of the battery. Thus, there is a need for techniques that prevent communication operations in a battery-operated wireless device from drawing current from the battery that exceeds the peak current rating of the battery.

This need is significantly prominent for wireless devices with small form factors. For instance, the current supplied by a power amplifier to the antenna port of a small-form-factor device may need to be significantly higher than in a device without a small form factor, since the antenna in a small-form-factor device is generally smaller than in a non-small-form-factor device. Smaller antennas generally require higher power to be delivered at their inputs in order to deliver a given power output to the wireless environment. This requires the power amplifier in a small-form-factor device to deliver higher power than in a non-small-form-factor device, which, in turn, increases the current draw from the battery by the power amplifier.

SUMMARY

Accordingly, systems, methods, and non-transitory computer-readable media are disclosed for preventing peak current draw from a battery in a wireless device.

In an embodiment, a method is disclosed. The method comprises using at least one hardware processor, in a wireless device that uses a battery as a power source for transmission to: receive a data payload to be transmitted; segment the data payload into one or more data payload segments based on a data payload size of the data payload and a peak current rating of the battery, such that each of the one or more data payload segments has a segment size which is estimated to result, during transmission of the data payload segment, in a maximum current draw from the battery that is less than the peak current rating of the battery; and transmit each of the one or more data payload segments, such that the transmission of one of the one or more data payload segments does not overlap in time with the transmission of any other one of the one or more data payload segments.

In another embodiment, a wireless device is disclosed. The wireless device comprises a battery, a transmitter, and at least one hardware processor configured to: receive a data payload to be transmitted; segment the data payload into one or more data payload segments based on a data payload size of the data payload and a peak current rating of the battery, such that each of the one or more data payload segments has a segment size which is estimated to result, during transmission of the data payload segment, in a maximum current draw from the battery that is less than the peak current rating of the battery; and transmit each of the one or more data payload segments, such that the transmission of one of the one or more data payload segments does not overlap in time with the transmission of any other one of the one or more data payload segments.

In a further embodiment, a non-transitory computer-readable medium is disclosed. The medium has instructions stored thereon, wherein the instructions, when executed by a processor, cause the processor to: receive a data payload to be transmitted; segment the data payload into one or more data payload segments based on a data payload size of the data payload and a peak current rating of the battery, such that each of the one or more data payload segments has a segment size which is estimated to result, during transmission of the data payload segment, in a maximum current draw from the battery that is less than the peak current rating of the battery; and transmit each of the one or more data payload segments, such that the transmission of one of the one or more data payload segments does not overlap in time with the transmission of any other one of the one or more data payload segments.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 4 is a flow diagram illustrating a segmentation control process, according to an embodiment; and FIGS. 5A and 5B are flow diagrams illustrating a segment size determination process, according to alternative embodiments.

DETAILED DESCRIPTION

In an embodiment, systems, methods, and non-transitory computer-readable media are disclosed for preventing peak current draw from a battery in a wireless device. Advantageously, embodiments disclosed herein prevent peak current draw from the battery of a wireless device, thereby reducing wear and tear on the battery and/or extending the life of the battery.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure

Figure 1:
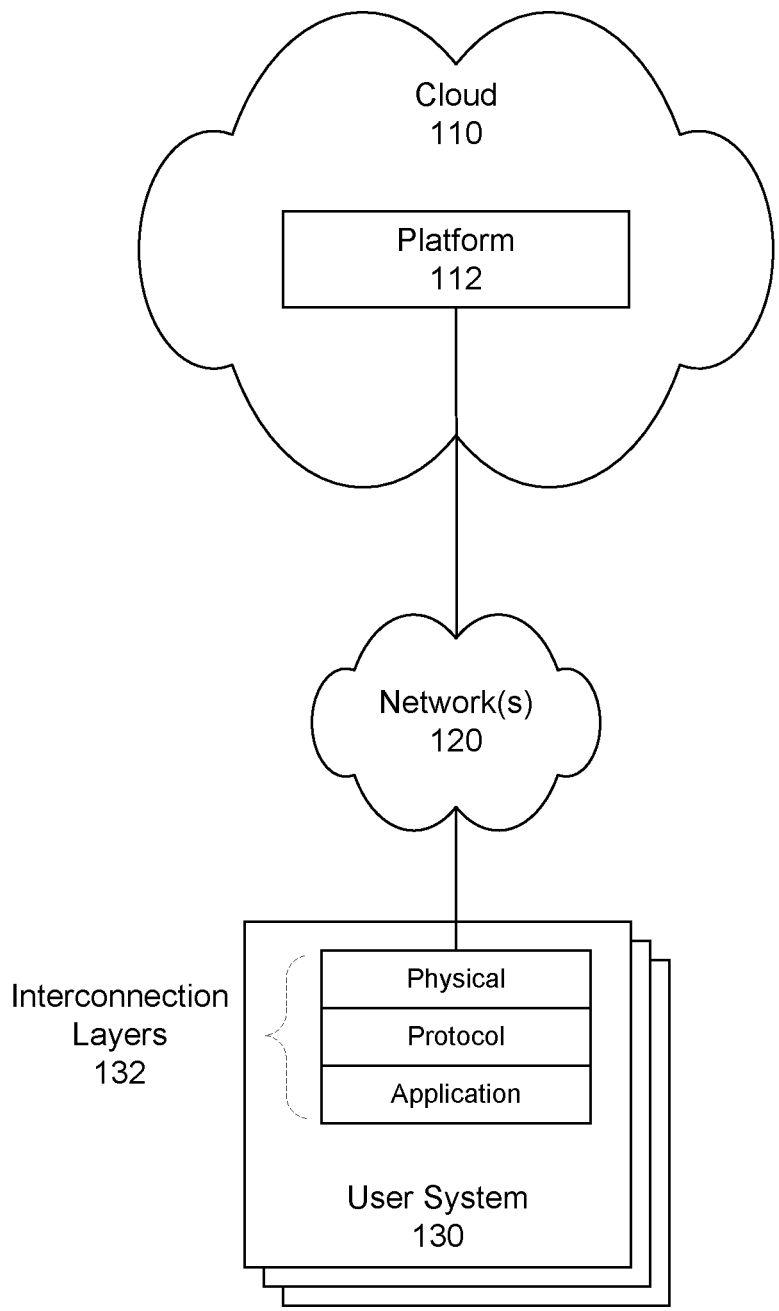
FIG. 1 illustrates an example infrastructure, in which one or more of the processes described herein, may be implemented, according to an embodiment.

FIG. 1 illustrates an example infrastructure in which the prevention of peak current draw may be beneficial, according to an embodiment. The infrastructure may comprise a platform 112 (e.g., one or more servers, applications, databases, services, networks, and/or resources) which hosts and/or executes one or more of the various processes described herein, for example, as software implementing the various processes. As illustrated, platform 112 is comprised in a cloud 110, such that platform 112 is implemented using on-demand access to a pool of collocated and/or dispersed resources (e.g., servers, applications, databases, services, networks, etc.) that are shared with other entities (e.g., other platforms). Cloud 110 may comprise a public cloud, private cloud, and/or other cloud type, including a hybrid cloud comprising a combination of different clouds and/or cloud types. In an alternative infrastructure without cloud 110 or in addition to cloud 110, platform 112 may comprise one or more dedicated resources (e.g., servers, applications, databases, services, networks, etc.) that are not shared with other entities.

As illustrated, platform 112 is communicatively connected to one or more user systems 130 via one or more networks 120. Network(s) 120 may comprise the Internet, and platform 112 may communicate with user system(s) 130 through the Internet using standard transmission protocols, such as HyperText Transfer Protocol (HTTP), Secure HTTP (HTTPS), File Transfer Protocol (FTP), FTP Secure (FTPS), SSH FTP (SFTP), and/or the like, as well as proprietary protocols. Network(s) 120 may also comprise one or more wireless networks, such as a cellular network that employs the LTE standard for high-speed wireless communications. While platform 112 is illustrated as being connected to all user systems 130 through a single set of network(s) 120, it should be understood that platform 112 may be connected to different user systems 130 via different sets of network(s).

Platform 112 may comprise a web service which receives requests from user system(s) 130, and provides responses in JavaScript Object Notation (JSON), eXtensible Markup Language (XML), and/or any other suitable or desired format. In such embodiments, platform 112 may provide an application programming interface (API) which defines the manner in which user system(s) 130 may interact with the web service. Thus, user system(s) 130 can define their own user interfaces, and rely on the web service to implement or otherwise provide the backend processes, storage, and/or the like. A client application executing on one or more user system(s) 130 may interact with a server application executing on platform 112 to execute one or more or a portion of one or more of the various processes described herein (e.g., implemented in software). The client application may be "thin," in which case processing is primarily carried out server-side by the server application on platform 112. Alternatively, the client application may be "thick," in which case processing is primarily carried out client-side by user system(s) 130. It should be understood that the client application on user system(s) 130 may perform an amount of processing, relative to the server application on platform 112, at any point along this spectrum between "thin" and "thick," depending on the design goals of the particular implementation.

User system(s) 130 may comprise any type or types of computing devices capable of wired and/or wireless communication, including without limitation, desktop computers, laptop computers, tablet computers, wireless terminals (e.g., smart phones or other mobile devices), servers, game consoles, televisions, set-top boxes, electronic kiosks, point-of-sale terminals, pagers, position tracking devices, household appliances, sensors, IoT devices, and/or the like. While only a few user systems 130 are illustrated, it should be understood that platform 112 may manage any number of user systems 130. Furthermore, it should be understood that, as used herein, the term "wireless device" may refer to the subset of user system(s) 130 which are battery-operated and utilize wireless communications.

As illustrated, user system(s) 130 may implement a set of interconnection layers 132 to facilitate communications between applications executing on user system(s) 130 and platform 112 over network(s) 120. Although not shown, platform 112 may implement a similar or identical set of interconnection layers 132. In the illustrated embodiment, interconnection layers 132 comprise a physical layer, a protocol layer, and an application layer. However, this illustrated set of layers is merely representative and non-limiting. In an embodiment, interconnection layers 132 may conform or be similar to the Open Systems Interconnection (OSI) reference model, which includes a physical layer, data-link layer, network layer, transport layer, session layer, presentation layer, and application layer, in that order from lowest to highest level of abstraction. In any case, interconnection layers 132 provide functions for facilitating a flow of data between a physical layer, in which bits are physically conveyed to and from network(s) 120 (e.g., at the electrical, optical, and/or radio level), through intermediate layer(s), and an application layer, which receives data, to be communicated, from applications (e.g., executing on user system(s) 130) and passes communicated data to those applications.

1.2. Example Processing Device

Figure 2:
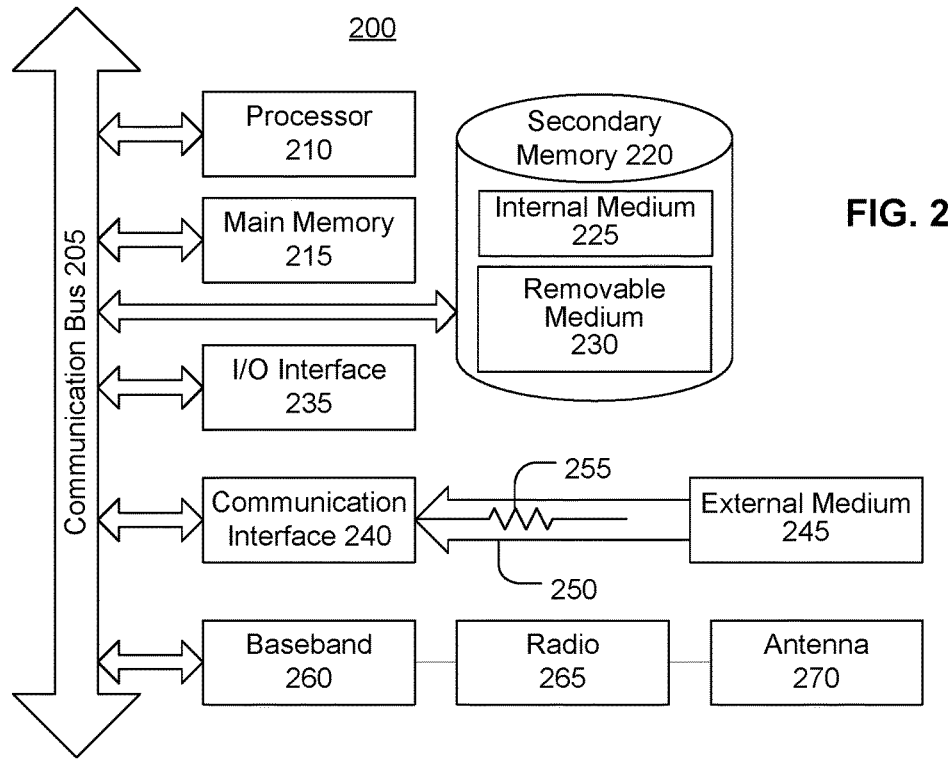
FIG. 2 illustrates an example processing system, by which one or more of the processed described herein, may be executed, according to an embodiment.

FIG. 2 is a block diagram illustrating an example wired or wireless system 200 that may be used in connection with various embodiments described herein. For example system 200 may be used in conjunction with one or more of the processes described herein (e.g., to execute software implementing the processes), and may represent components of platform 112, user system(s) 130, and/or other processing devices described herein. System 200 can be any processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 200 preferably includes a main memory 215 and may also include a secondary memory 220. Main memory 215 provides storage of instructions and data for programs executing on processor 210, such as one or more of the functions and/or modules discussed above. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal memory 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, etc.

Removable storage medium 230 is a non-transitory computer-readable medium having stored thereon computer-executable code (e.g., disclosed software modules) and/or data. The computer software or data stored on removable storage medium 230 is read into system 200 for execution by processor 210.

In alternative embodiments, secondary memory 220 may include other similar means for allowing computer programs or other data or instructions to be loaded into system 200. Such means may include, for example, an external storage medium 245 and a communication interface 240, which allows software and data to be transferred from external storage medium 245 to system 200. Examples of external storage medium 245 may include an external hard disk drive, an external optical drive, an external magneto-optical drive, etc. Other examples of secondary memory 220 may include semiconductor-based memory such as programmable read-only memory (PROM), erasable programmable read-only memory (EPROM), electrically erasable read-only memory (EEPROM), or flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 200 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (i.e., computer programs, such as the disclosed application, or software modules) is stored in main memory 215 and/or the secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code (e.g., software and computer programs) to system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable mediums are means for providing executable code, programming instructions, and software to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform the features and functions described elsewhere herein.

In an embodiment, I/O interface 235 provides an interface between one or more components of system 200 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and the like.

System 200 may also include optional wireless communication components that facilitate wireless communication over a voice network and/or a data network. The wireless communication components comprise an antenna system 270, a radio system 265, and a baseband system 260. In system 200, radio frequency (RF) signals are transmitted and received over the air by antenna system 270 under the management of radio system 265.

In one embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive signal, which is sent from radio system 265 to baseband system 260.

Baseband system 260 decodes a signal. Baseband system 260 also codes the digital signals for transmission and generates a baseband transmit signal that is routed to radio system 265. The radio mixes the baseband transmit signal with an RF carrier signal generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments. For example, data storage areas 215 or 220 may include various software modules.

2. Process Overview

Embodiments of processes for preventing peak current draw from a battery of a wireless device will now be described in detail. Generally, the processes described herein will be implemented locally in software (e.g., as one or more threads or functions operating in one or more of interconnection layers 132) on a battery-operated wireless device.

However, more broadly, the described processes may be embodied in one or more software modules that are executed by one or more hardware processors, e.g., as the client and/or server applications discussed above, which may be executed wholly by processor(s) of platform 112, wholly by processor(s) of user system(s) 130, or may be distributed across platform 112 and user system(s) 130 such that some portions or modules are executed by platform 112 and other portions or modules are executed by user system(s) 130. The described processes may be implemented as instructions represented in source code, object code, and/or machine code. These instructions may be executed directly by the hardware processor(s), or alternatively, may be executed by a virtual machine operating between the object code and the hardware processors.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

2.1. Uplink Transmission Power Related to Data Payload Size

Typically, the uplink transmission power required to transmit a signal via an antenna in a wireless device is determined by a plurality of factors. Using an LTE system as an example, the transmission power used by a wireless device to transmit in the Physical Uplink Shared Channel (PUSCH) transmission of LTE is defined below as Equation 1:

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\} \quad [\text{Eq. 1}]$$

wherein $P_{PUSCH}$ (i) is the transmission power to be used for subframe i (defined in decibel scale);

$P_{CMAX}$ is the configured transmission power for the wireless device;

$M_{PUSCH}$ (i) is the resource assignment in resource blocks for subframe i;

$P_{O\_PUSCH}$ (j) is a parameter composed of the sum of cell-specific nominal and wireless-device-specific components provided by higher layers;

PL is the downlink path loss estimate calculated in the wireless device in dB;

$\alpha(j)$ is a parameter $\alpha \in \{0.0\ 0.4, 0.5, 0.6, 0.7, 0.8, 0.9, 1.0\}$;

$\Delta_{TF}$ (i) is a modulation and coding scheme (MCS) related power offset; and f (i) is a closed-loop power-control-related parameter.

As demonstrated by Equation 1, in an LTE system, the transmission power level, $P_{PUSCH}$ (i) the depends directly and linearly on data payload size, $M_{PUSCH}$ (i). Thus, the transmission power level increases in proportion to the data payload size. For example, doubling the data payload size will double the required transmission power level in an LTE system. Conversely, decreasing the data payload size will also decrease the required transmission power level.

While embodiments, including algorithms, will be disclosed herein, primarily, using the example of an LTE system, LTE systems are merely one example of a system in which the disclosed embodiments may operate. It should be understood that the disclosed embodiments may be implemented in any system in which uplink transmission power is correlated to data payload size (e.g., resource block assignment size). For example, the disclosed embodiments may be implemented in any system which utilizes orthogonal frequency-division multiplexing (OFDM).

2.2. Payload Segmentation

Embodiments take advantage of the correlation between data payload size and transmission power level, in communication systems in which such a relationship exists, by dividing or segmenting a data payload, to be transmitted by a wireless device, into data payload segments, and transmitting those data payload segments one at a time. As discussed above, the transmission power needed to transmit each of the data payload segments will be smaller than the transmission power needed to transmit the entire data payload at once. For example, after segmentation, each data payload segment may have fewer resource block assignments compared to the original data payload. Consequently, the current required to transmit each of the data payload segments will be smaller than the current required to transmit the entire data payload at once. In an embodiment, the segmentation of the data payload into data payload segments is designed such that the maximum current draw from the battery is smaller than the peak current rating of the battery.

Figure 3:
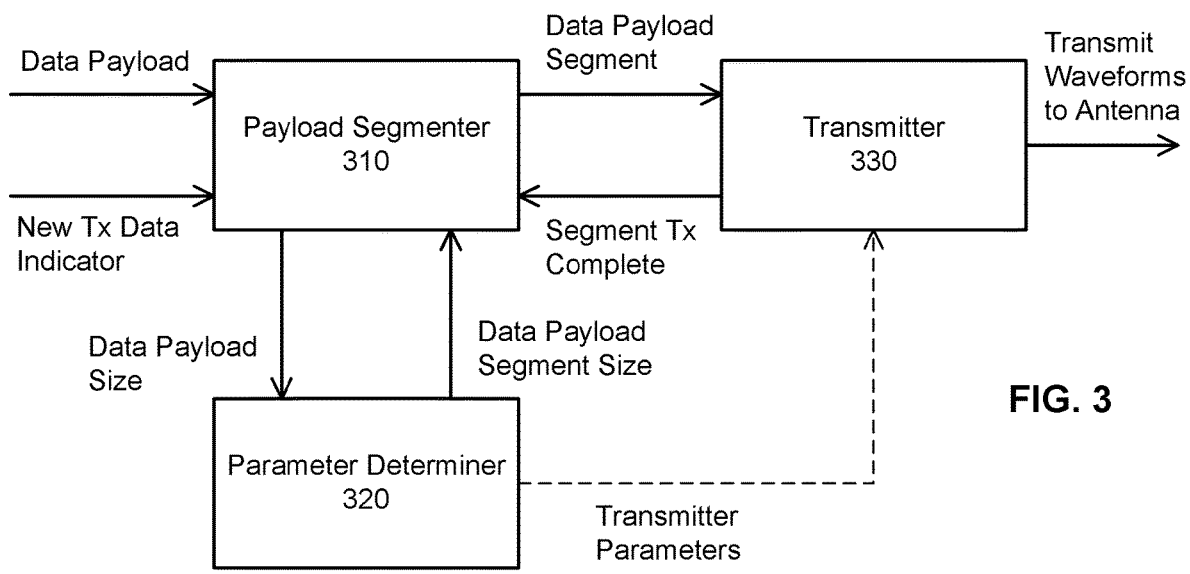
FIG. 3 is a block diagram illustrating components of a segmentation control process, according to an embodiment.

FIG. 3 is a block diagram illustrating components of a segmentation control process, according to an embodiment. The illustrated segmentation control process may be implemented in software and/or hardware and within any of interconnection layers 132 (e.g., the application layer).

Initially, a data payload is received at a payload segmenter 310. The data payload may be an application-layer payload or a lower-level payload, produced by a software stack of an LTE mode corresponding to processing in interconnection layers 132 (e.g., OSI stack layers). For ease of understanding, but without a loss of generality, embodiments described herein will generally assume that the data payload is an application-layer payload that is generated by an application (e.g., user application), and that payload segmenter 310 is implemented as a function in the application layer. In an embodiment, a new transmission (Tx) data indicator message or signal may be provided to payload segmenter 310 (e.g., as a control signal) to indicate the presence of a new data payload.

In an embodiment, payload segmenter 310 determines the data payload size whenever a new data payload is received (e.g., when indicated by new transmission data indicator signal). For example, payload segmenter 310 may receive the data payload size with the data payload, calculate the data payload size from the data payload, extract the data payload size from meta-information received with the data payload, and/or the like. Regardless of how the data payload size is determined, payload segmenter 310 provides the data payload size to parameter determiner 320.

In the illustrated embodiment, parameter determiner 320 determines a data payload segment size, based, at least in part, on the data payload size received from payload segmenter 310. In addition, parameter determiner 320 may determine the segment size, based on one or more operational parameters (e.g., estimated path loss) of the wireless device. As discussed elsewhere herein, the segment size may be determined using a table and/or an algorithm (e.g., Equation 1, solved for $M_{PUSCH}$ (i), or another equation which provides current draw or segment size as a function of data payload size). Regardless of how the segment size is determined, the segment size is set so as to ensure that the current drawn from the battery to transmit a data payload segment of that segment size is less than the current peak rating of the battery providing power for the transmission. Once the segment size has been determined, parameter determiner 320 provides the segment size to payload segmenter 310.

In addition, parameter determiner 320 may also determine and provide a set of one or more transmitter parameters to transmitter 330. However, in some embodiments, the transmitter parameter(s) may be omitted, parameter determiner 320 may provide the transmitter parameter(s) to transmitter 330 indirectly via payload segmenter 310, or payload segmenter 310, instead of parameter determiner 320, may determine and provide the set of transmitter parameter(s) to transmitter 330. These transmitter parameter(s) may indicate the data payload segment size determined by parameter determiner 320 to transmitter 330, indicate to transmitter 330 that each packet should be transmitted one at a time, and/or the like.

After payload segmenter 310 has received the segment size from parameter determiner 320, payload segmenter 310 may divide the data payload into data payload segments, based, at least in part, on the received segment size. To the extent that the data payload size is not an integer multiple of the segment size, dummy bits may be used, for example, to fill in any unused space in the last data payload segment.

Payload segmenter 310 provides each data payload segment to transmitter 330. Transmitter 330 performs the processing in one or more of interconnection layers 132 (e.g., the physical layer in the OSI stack layers) to generate waveforms, and provides the waveforms to be transmitted to one or more antennas of the wireless device. Once the waveforms have been transmitted, transmitter 330 returns a segment transmission (Tx) complete message or signal to payload segmenter 310. The segment transmission complete signal indicates at least that any current needed to transmit the data payload segment has been drawn or is guaranteed to be drawn before current is drawn to transmit any subsequent data payload segment. This ensures that the transmission of two or more data payload segments do not overlap, since, if this were to happen, the sum of the current drawn by multiple simultaneous transmissions could exceed the peak current rating of the battery.

In an embodiment, payload segmenter 310 provides each data payload segment of the data payload to transmitter 330 one at a time, and ensures completion of the transmission prior to providing the next data payload segment to transmitter 330. For example, payload segmenter 310 may provide the first data payload segment to transmitter 330, wait for a first segment transmission complete signal, in response to receiving the first segment transmission complete signal, provide the second data payload segment to transmitter 330, wait for a second segment transmission complete signal, in response to receiving the second segment transmission complete signal, provide the third data payload segment to transmitter 330, and so on, until a segment transmission complete signal is received for the final data payload segment. This feedback mechanism guarantees that the transmission of each data payload segment is performed in a different subframe of LTE uplink transmission. Consequently, the transmission power during each transmission of each data payload segment is guaranteed to be less than the peak current rating of the battery.

In an embodiment, payload segmenter 310 may embed a counter value or sequence identifier into each of the data payload segments (e.g., within packet headers of the data payload segments), so that the data payload segments may be transmitted asynchronously and reassembled at the destination device (e.g., using a function within the same OSI stack layer as payload segmenter 310). In addition, payload segmenter 310 may embed the original data payload size into one or more of the data payload segments (e.g., within a packet header of the first data payload segment), or the data payload size may be a known fixed value.

FIG. 4 is a flow diagram illustrating a segmentation control process 400, according to an embodiment. The illustrated segmentation control process 400 may be implemented in software and/or hardware and within any of interconnection layers 132 (e.g., the application layer). For example, process 400 may be implemented using the functional modules illustrated and described with respect to FIG. 3. In addition, process 400 may be implemented with more, fewer, or a different arrangement of steps than illustrated in FIG. 4.

In an embodiment, process 400 begins in step 410 with an initialization process. During the initialization process, data, necessary for process 400, may be loaded or set, for example, in parameter determiner 320. This loaded data may comprise the peak current rating for the battery used for transmission in the wireless device, the current draw table (e.g., providing estimated current draw during a transmission mode as a function of transmitted payload size) described elsewhere herein or a function (e.g., an equation which provides current draw during a transmission mode or segment size as a function of transmitted payload size), and/or any other parameters or other data. In an alternative embodiment, step 410 may be omitted or may simply consist of loading software, implementing process 400, into memory for execution.

In an embodiment, in step 420, process 400 enters a waiting state. Specifically, step 420 blocks until a new data payload is received. In response to the reception of a new data payload (i.e., "YES" in step 420), process 400 proceeds to step 430. Otherwise, for as long as no new data payload is received (i.e., "NO" in step 420), process 400 continues to wait for a new data payload. In the embodiment illustrated in FIG. 3, step 420 may be implemented by payload segmenter 310, which may determine that a new data payload is received whenever it receives a data payload and/or the new transmission data indicator. In an embodiment, step 420 may comprise a combination of two steps: (1) payload segmenter 310 receives the new transmission data indicator, indicating that a new data payload is to be received; and (2) subsequently, payload segmenter 310 receives the new data payload to be transmitted. An application in the wireless device, or a function in interconnection layers 132 (e.g., OSI stack layer) of the wireless transceiver, may generate the new data payload to be transmitted.

In step 430, in response to a new data payload being received in step 420, the data payload segment size is determined. For example, with reference to the embodiment illustrated in FIG. 3, payload segmenter 310 may determine the data payload size and pass the data payload size to parameter determiner 320, which determines (e.g., using the current draw table or function) the segment size and returns the determined segment size to payload segmenter 310.

In step 440, the data payload received in step 420 is segmented into one or more data payload segments having the data payload segment size determined in step 430. It should be understood that, if the segment size, determined in step 430, is equal to or greater than the data payload size, no actual segmentation is performed. Rather, in this case, the data payload segment used in subsequent steps would be the entire data payload. It should also be understood that the size of the data payload segments may be less than the segment size determined in step 430, as long as they are not greater than the segment size. In the event that one data payload segment is less than the size of other data payload segments (e.g., the last data payload segment after segmentation, in the event that the data payload size is not a multiple of the segment size), dummy bits may be appended to that data payload segment to increase its size to the segment size of the other data payload segments, such that each data payload segment has the same size.

In step 450, a data payload segment is transmitted. For example, with reference to the embodiment illustrated in FIG. 3, payload segmenter 310 may pass the data payload segment to transmitter 330. Transmitter 330 may then transmit the data payload segment by converting the data payload segment to waveforms which are passed to one or more wireless antennas for transmission. In other words, transmitter 330 may perform the processing in interconnection layers 132 (e.g., OSI stack layers) necessary to transmit the data payload segment within the physical layer. Once the transmission is complete (e.g., any current needed to transmit the data payload segment has been drawn or is guaranteed to be drawn before current is drawn to transmit any subsequent data payload segment), transmitter 330 may return a segment transmission complete message or signal to payload segmenter 310.

In an embodiment, in step 460, process 400 enters a waiting state. Specifically, step 460 blocks until transmission is complete (e.g., that any current needed to transmit the data payload segment has been drawn or is guaranteed to be drawn before current is drawn to transmit any subsequent data payload segment). For example, with reference to the embodiment illustrated in FIG. 3, payload segment 310, after passing the data payload segment to transmitter 330 in step 450, may wait for transmitter 330 to return a segment transmission complete message or signal. As long as the transmission of the data payload segment is not complete (i.e., "NO" in step 460), process 400 continues to wait for the transmission to be completed. On the other hand, once the transmission has been completed (i.e., "YES" in step 460), process 400 proceeds to step 470. As discussed above with respect to the embodiment illustrated in FIG. 3, the transmission may be determined to have been completed once a segment transmission complete message or signal is received.

In step 470, process 400 determines whether or not any data payload segments remain to be transmitted. For example, payload segmenter 310 may determine whether or not any additional segments from the data payload, received in step 420, remain to be transmitted. As discussed above, the number of data payload segments may be one (e.g., if the segment size, determined in step 430, is equal to or greater than the size of the data payload received in step 420), in which case steps 450, 460, and 470 will only be performed once, or more than one (e.g., if the segment size, determined in step 430, is less than the size of the data payload received in step 420), in which case steps 450, 460, and 470 will loop through a plurality of iterations. If any data payload segments remain to be transmitted (i.e., "YES" in step 470), process 400 returns to step 450 to transmit the next data payload segment. Otherwise, if no data payload segments remain to be transmitted (i.e., "NO" in step 470), process 400 returns to the waiting state in step 420, or, alternatively, ends.

2.3. Determination of Data Payload Segment Size

As discussed above with respect to the embodiment of the segmentation control process 400 illustrated in FIG. 4, a data payload segment size is determined in step 430. In step 430, the data payload segment size may be determined using a current draw table or function that provides a current draw as a function of payload size and/or other parameters.

One non-limiting example of a current draw table is shown in Table 1 below:

TABLE 1

Current Draw Table

| Quantized Data Payload Size | Quantized Path Loss | Estimated Current Draw |
| --- | --- | --- |
| QDPS(1) | QPL(1) | I_EST(1,1) |
| QDPS(1) | QPL(2) | I_EST(1,2) |
| ... | ... | ... |
| QDPS(1) | QPL(M) | I_EST(1,M) |
| QDPS(2) | QPL(1) | I_EST(2,1) |
| ... | ... | ... |
| QDPS(2) | QPL(M) | I_EST(2,M) |
| ... | ... | ... |
| QDPS(N) | QPL(1) | I_EST(N,1) |
| QDPS(N) | QPL(2) | I_EST(N,2) |
| ... | ... | ... |
| QDPS(N) | QPL(M) | I_EST(N,M) |

As illustrated in Table 1, the current draw table may comprise a plurality of records, with each record comprising a tuple of a quantized payload size ("QDPS", e.g., specified in kilobytes), a quantized path loss ("QPL"), and the estimated current draw ("I_EST", e.g., specified in milliamps) required to transmit that quantized payload size with that quantized path loss. It should be understood that other tuples, with fewer, more, or a different arrangement of operational parameters may be used.

The use of a current draw table, as opposed to an equation, can facilitate low-complexity operation. In the example in Table 1, the current draw table quantizes a range of data payload sizes into N distinct data payload sizes, i.e., QDPS(1) through QDPS(N). In an embodiment, the range of quantized data payload sizes may consist of multiples of two, such as consecutive multiples of two (e.g., 2, 4, 8, 16, 32, 64, 128, 256, 512, 1024, 2048, etc.). Similarly, the example current draw table quantizes a range of path loss values into M distinct path loss values, i.e., QPL(1) through QPL(M). Collectively, the N quantized data payload sizes QDPS(1) through QDPS(N) may represent an entire range of data payload sizes that may be encountered during the operation of the wireless device, and the M quantized path loss values QPL(1) through QPL(M) may represent an entire range of path loss values that may be encountered during the operation of the wireless device. In the event that the actual data payload size (e.g., determined for a payload by payload segmenter 310) is not identical to one of the quantized data payload sizes (i.e., does not equal one of QDPS(1)-QDPS (N)), the actual data payload size may be matched to the smallest QDPS in the set of {QDPS(1), . . . , QDPS(N)} that is greater than the actual data payload size. Thus, for example, if the quantized data payload sizes are {32 kb, 64 kb, 128 kb, 256 kb, 512 kb, 1024 kb}, an actual data payload size of 100 kb would match to the quantized data payload size of 128 kb. Similarly, in the event that the actual estimated path loss value anticipated for uplink communications (e.g., between the wireless device and a wireless infrastructure port) is not identical to one of the quantized path loss values (i.e., does not equal one of QPL(1)-QPL (M)), the actual estimated path loss value may be matched to the smallest QPL in the set of {QPL(1), . . . , QPL(M)} that is greater than the actual estimated path loss value.

The current draw table may provide an estimated current draw for any given operational condition, defined by one or more parameters. Preferably, at least one of these parameters is or corresponds to data payload size. For example, in the example in Table 1, the current draw table provides an estimated current draw in the third column for an operational condition defined by a pair of parameters in the first two columns: data payload size in the first column, and path loss value in the second column.

The current draw table may be populated in a wireless device by performing an a priori calculation to obtain the estimated current draw I_EST of a wireless device for each operational condition (e.g., each pair of QDPS and QPL). The calculation may take into account transmission power (e.g., obtained using Equation 1), the current that transmitter components (e.g., Radio Frequency Integrated Circuit (RFIC), power amplifier, etc.) would draw at that transmission power, and/or the current that other components of the wireless device (e.g., non-transmitter components needed to operate the wireless device) are anticipated to draw.

Figure 5A:
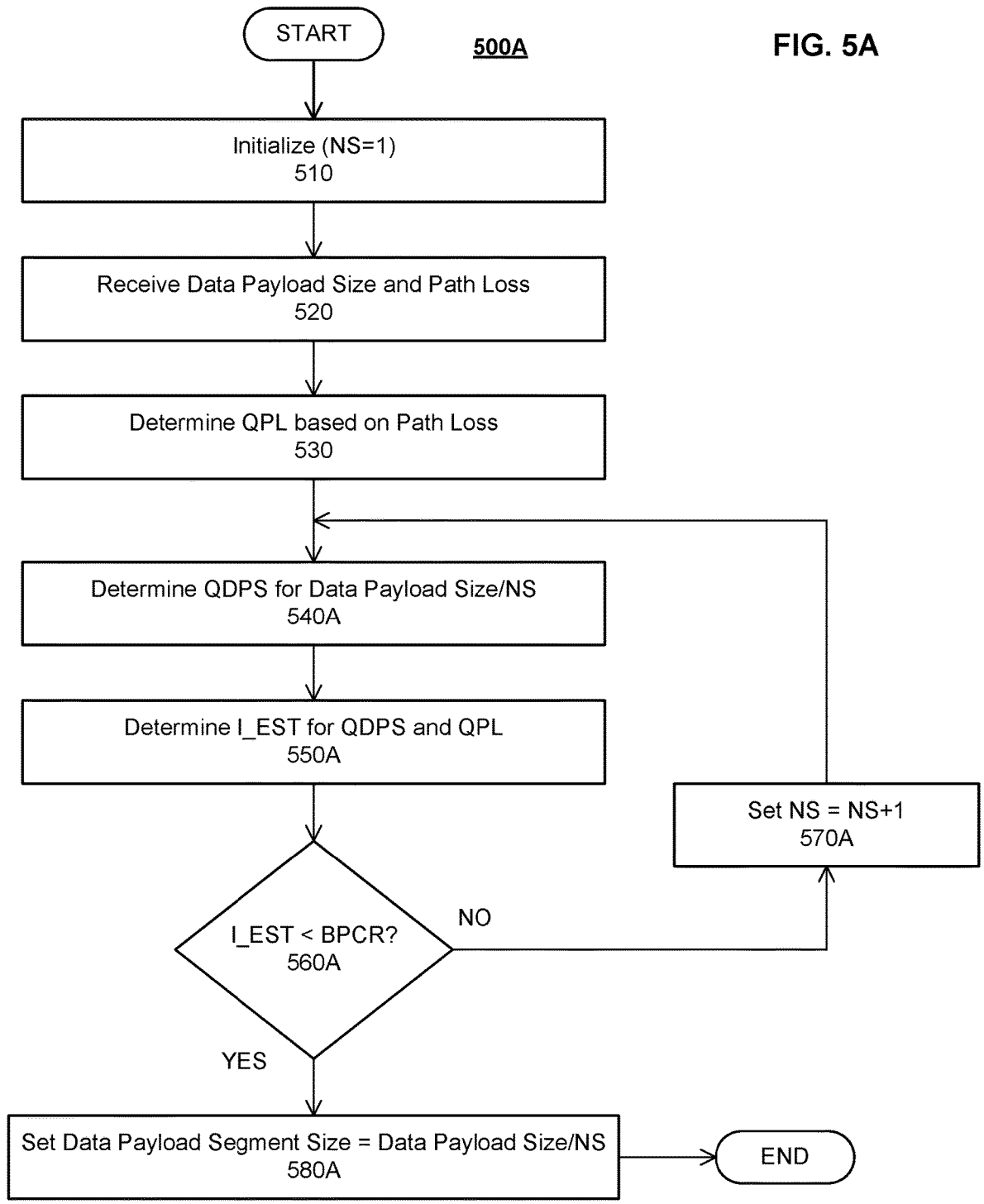

FIGS. 5A and 5B are flow diagrams illustrating a segment size determination process 500, according to alternative embodiments. The illustrated segment size determination processes 500 may be implemented in software and/or hardware and within any of interconnection layers 132 (e.g., the application layer). For example, processes 500 may be implemented by parameter determiner 320 illustrated and described with respect to FIG. 3. Furthermore, processes 500 may represent an implementation of step 430 illustrated and described with respect to FIG. 4. In addition, processes 500 may be implemented with more, fewer, or a different arrangement of steps than illustrated in FIGS. 5A and 5B.

In an embodiment, processes 500 begin in step 510 with initialization. During initialization, data, necessary for processes 500, may be loaded or set, for example, in parameter determiner 320. In the illustrated embodiment, the number of segments (NS) is initialized to one. It should be understood that one segment would represent an entire data payload. Other parameters, such as the battery peak current rating (BPCR), can also be set in step 510.

In step 520, the data payload size and path loss may be received. The order in which these parameters are received is not important. In the embodiment illustrated in FIG. 3, the data payload size may be received by parameter determiner 320 from payload segmenter 310, and represents the size of the data payload to be segmented. The path loss may be calculated by and received from a software or hardware component of the wireless device responsible for estimating path loss.

In step 530, a quantized path loss QPL is determined for the path loss received in step 520. As discussed above, in the event that the path loss is not identical to one of the quantized path losses represented in the current draw table, the quantized path loss QPL for the received path loss may be determined as the smallest QPL, represented in the current draw table, that is greater than the received path loss (i.e., essentially rounded up to the nearest QPL in the current draw table).

In step 540A, a quantized data payload size QDPS is determined for the data payload size received in step 520, in view of the current number of segments. For example, the received data payload size may be divided by the number of segments to determine a segment size. It should be understood that, in this example, in the first iteration (i.e., NS=1), the segment size will simply be the data payload size received in step 520, and that in subsequent iterations, the segment size will be a decreasing factor of the data payload size received in step 520. Once the segment size has been determined, a quantized data payload size QDPS is determined for that segment size. As discussed above and similarly to the determination of the QPL, in the event that the segment size is not identical to one of the quantized data payload sizes represented in the current draw table, the quantized data payload size QDPS for the segment size may be determined as the smallest QDPS, represented in the current draw table, that is greater than the segment size (i.e., essentially rounded up to the nearest QDPS in the current draw table).

In step 550A, the estimated current draw I_EST that corresponds to the QPL, determined in step 530, and the QDPS, determined in step 540A, is determined. For example, I_EST(QDPS,QPL) is retrieved from the current draw table depicted in Table 1. Alternatively, I_EST(QDPS, QPL) may be calculated using an equation.

In step 560A, the estimated current draw I_EST(QDPS, QPL), determined in step 550A, is compared to the battery peak current rating. If the estimated current draw rating I_EST(QDPS,QPL) is less than the battery peak current rating (i.e., "YES" in step 560A), process 500A proceeds to step 580A. Otherwise, if the estimated current draw I_EST (QDPS,QPL) is greater than the battery peak current rating (i.e., "NO" in step 560A), process 500A proceeds to step 570A. It should be understood that, if the estimated current draw I_EST(QDPS,QPL) is equal to the battery peak current rating, process 500A could be designed to proceed to either step 570A or step 580A. However, in the illustrated embodiment, process 500A is shown to proceed to step 570A in the event of equality, so as to prevent the current draw, from the battery by the transmitter of the wireless device, from equaling the battery peak current rating.

In an alternative embodiment, step 560A may comprise comparing the estimated current draw I_EST(QDPS,QPL) to the difference between the battery peak current rating and a set threshold amount (e.g., I_EST(QDPS,QPL)<BPCR-threshold). It should be understood that this comparison could be expressed and implemented in a variety of different ways. Because the calculations performed herein may be performed using estimates, use of a set threshold amount provides some room for error, so as to reduce the possibility that the actual current draw exceeds the battery peak current rating even when the estimated current draw I_EST turns out to be a low estimate. Alternatively or additionally, the I_EST in the current draw table may be calculated a priori to be a conservative estimate with built-in error, so as to reduce the possibility that the actual current draw exceeds the battery peak current rating.

In step 570A, since the estimated current draw I_EST (QDPS,QPL) exceeds the battery peak current rating, the number of segments is incremented. In the illustrated embodiment, the number of segments is incremented by one (i.e., NS=NS+1). However, in alternative embodiments, the number of segments may be incremented by more than one (e.g., 2, 3, 4, etc.). In either case, process 500A then returns to step 540A, in which a new segment size is calculated using the incremented number of segments, and a new quantized data payload size QDPS is determined from the new segment size.

In step 580A, the data payload segment size is set based on the current number of segments (i.e., NS). For example, the data payload segment size is set as the quotient of the data payload size, received in step 520, divided by the number of segments. In an embodiment, if the quotient is a non-integer, the quotient may be rounded to the nearest integer (e.g., always rounded down to the nearest integer, always rounded up to the nearest integer, or simply rounded up or down to the nearest integer). In an alternative embodiment, the data payload segment size may be set in step 580A to the current QDPS determined in step 540A (i.e., most recently determined QDPS). In either embodiment, the set data payload segment size may be returned as the result of process 500A (e.g., by parameter determiner 320 to payload segmenter 310), which then ends.

While division by the number of segments has been used to describe the determination of the segment sizes in steps 540A and 580A, the segment sizes in these steps could be determined in a different manner. FIG. 5B illustrates an alternative to process 500A, process 500B, in which the segment sizes may be determined in a different manner than division by the number of segments. Since, steps 510-530 in process 500B are identical to those in process 500A, described with respect to FIG. 5A, a description of these steps will not be repeated.

In step 532 of process 500B, the data payload size, received in step 530, is divided into the number of segments (i.e., NS). Unlike process 500A, in which each data payload segment is assumed to have the same segment size, in process 500B, each data payload segment may have the same or different segment sizes. Thus, in step 532, the data payload size may be divided into NS segments of any arbitrary size. For example, for a data payload size of 250 kb and NS=3, the data payload size may be divided into three segments with sizes of 100 kb, 100 kb, and 50 kb. Collectively, the segment sizes should sum to the data payload size. While the data payload size may be divided according to any algorithm, the algorithm should attempt to optimize the segment sizes, for the current number of segments, with respect to the battery peak current rating.

In steps 534-560B, the segment size for each of the NS segments, produced in step 532, may be considered, or at least until one of the segment sizes fails to satisfy the condition in step 560B. Thus, in step 534, if any segment sizes remain to be considered (i.e., "YES" in step 534), the next segment size is selected, and process 500B proceeds to step 540B. Otherwise, if no segment sizes remain to be considered (i.e., "NO" in step 534), process 500B proceeds to step 580B.

In step 540B, a quantized data payload size QDPS is determined for the current segment size. The determination of the QDPS may be similar or identical to the process described with respect to step 540A. Specifically, if the current segment size equals a QDPS in the current draw table, then that QDPS is used. Otherwise, if the current segment size does not equal one of the quantized data payload sizes represented in the current draw table, the smallest QDPS, in the current draw table, that is greater than the current segment size, may be used.

In step 550B, the estimated current draw I_EST that corresponds to the QPL, determined in step 530, and the QDPS, determined in step 540B, is determined. For example, I_EST(QDPS,QPL) is retrieved from the current draw table depicted in Table 1, or calculated using an equation.

In step 560B, the estimated current draw I_EST(QDPS, QPL), determined in step 550B, is compared to the battery peak current rating. This comparison may be performed in a similar or identical manner as in step 560A, described with respect to FIG. 5A. Accordingly, a description of this step will not be repeated. If the comparison is positive (i.e., "YES" in step 560B), process 500B returns to step 534. Otherwise, if the comparison is negative (i.e., "NO" in step 560B), process 500B proceeds to step 570B.

In step 570B, since the estimated current draw I_EST (QDPS,QPL) for one of the segment sizes determined in step 532 is greater than the battery peak current rating, transmission of a data payload segment of that segment size would likely result in a current draw that exceeds the battery peak current rating. Consequently, using the division of NS segments, determined in step 532, to transmit the data payload segments, could adversely affect the battery. Accordingly, the number of segments is incremented, and process 500B returns to step 532. The number of segments may be incremented in any manner (e.g., NS=NS+1, NS=NS+2, NS=NS×2, etc.). Alternatively, the number of segments, at least in some iterations of the loop formed by steps 532-570B, may not be incremented. In those instances, process 500B may return to step 532 to determine a different division of the data payload size into the same number of segments as in the previous iteration of step 532.

Once a division of the data payload size has been determined in which each data payload segment size satisfies the comparison in step 560B (i.e., "NO" in step 534), process 500B proceeds to step 580B. In step 580B, the segment sizes determined in the most recent iteration of step 532 are set as the segment sizes to be used for transmission. For instance, with reference to the embodiment illustrated in FIG. 3, parameter determiner 320 may return a vector of NS segment sizes to payload segmenter 310, and payload segmenter 310 may divide the data payload into NS segments according to the NS segment sizes. As an example, for a data payload size of 250 kb, parameter determiner 320 may return a vector of {100 kb, 100 kb, 50 kb}, in which case payload segmenter 310 will divide the data payload into three segments of 100 kb, 100 kb, and 50 kb. In this case, payload segmenter 310 may also append dummy bits to the end of the last data payload segment to increase its size from 50 kb to 100 kb.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method comprising using at least one hardware processor, in a wireless device that uses a battery as a power source for transmission, to:
   receive a data payload to be transmitted;
   segment the data payload into one or more data payload segments based on a data payload size of the data payload and a peak current rating of the battery, wherein a largest of the one or more data payload segments has a segment size which is estimated to result, during transmission of the data payload segment, in a maximum current draw from the battery that is less than the peak current rating of the battery; and
   transmit each of the one or more data payload segments, so as to ensure that the transmission of one of the one or more data payload segments does not overlap in time with the transmission of any other one of the one or more data payload segments.

2. The method of claim 1, wherein segmenting the data payload into one or more data payload segments comprises:
   for each of one or more potential segment sizes,
      determining a quantized size corresponding to the potential segment size,
      retrieving an estimated current draw that is associated with one or more operational parameters, comprising the quantized size, from a local memory of the wireless device, and
      comparing the estimated current draw to the peak current rating of the battery; and
   selecting one of the one or more potential segment sizes as the segment size of at least one of the one or more data payload segments based on each comparison.

3. The method of claim 2, wherein the one or more data payload segments comprise a plurality of data payload segments, and wherein the selected segment size is used for all of the plurality of data payload segments.

4. The method of claim 3, wherein segmenting the data payload into the plurality of data payload segments comprises, when the data payload size is not a multiple of the selected segment size:
   segmenting the data payload into one or more first data payload segments, each having the selected segment size, and at least one second data payload segment having a segment size that is smaller than the selected segment size; and
   appending dummy bits to an end of the at least one second data payload segment to increase the segment size of the at least one second data payload segment to the selected segment size.

5. The method of claim 2, wherein determining a quantized size corresponding to the potential segment size comprises:
   when the potential segment size equals a quantized size within a range of available quantized sizes, determining the equivalent quantized size as corresponding to the potential segment size; and,
   when the potential segment size does not equal a quantized size within the range of available quantized sizes, determining a minimum quantized size, within the range of available quantized sizes, that is greater than the potential segment size, as corresponding to the potential segment size.

6. The method of claim 2, wherein segmenting the data payload into one or more data payload segments further comprises, for each of the one or more potential segment sizes, determining a quantized path loss corresponding to an estimated path loss anticipated for transmission of the data payload, and wherein the one or more operational parameters further comprise the quantized path loss.

7. The method of claim 6, wherein determining a quantized path loss corresponding to the estimated path loss comprises:
   when the estimated path loss equals a quantized path loss within a range of available quantized path losses, determining the equivalent quantized path loss as corresponding to the estimated path loss; and,
   when the estimated path loss does not equal a quantized path loss within the range of available quantized path losses, determining a minimum quantized path loss, within the range of available quantized path losses, that is greater than the estimated path loss, as corresponding to the estimated path loss.

8. The method of claim 2, wherein retrieving an estimated current draw that is associated with one or more operational parameters comprises accessing a table that comprises a plurality of records, wherein each of the plurality of records associates an estimated current draw with a set of one or more quantized operational parameters.

9. The method of claim 2, wherein segmenting the data payload into one or more data payload segments further comprises:
   starting with a number of segments equal to one and until the estimated current draw for a calculated potential segment size is determined to be less than the peak current rating of the battery,
      calculating a potential segment size by dividing the data payload size by the number of segments,
      performing the determining, retrieving, and comparing for the calculated potential segment size, and
      incrementing the number of segments;
   wherein the selected segment size is the calculated potential segment size for which the estimated current draw is determined to be less than the peak current rating of the battery.

10. The method of claim 9, wherein incrementing the number of segments comprises incrementing the number of segments by one.

11. The method of claim 1, wherein segmenting the data payload into one or more data payload segments comprises calculating the segment size as a function of one or more operational parameters, comprising the data payload size.

12. The method of claim 11, wherein the one or more operational parameters further comprise an estimated path loss anticipated for transmission of the data payload.

13. A wireless device comprising:
   a battery;
   a transmitter; and
   at least one hardware processor configured to
      receive a data payload to be transmitted,
      segment the data payload into one or more data payload segments based on a data payload size of the data payload and a peak current rating of the battery, wherein a largest of the one or more data payload segments has a segment size which is estimated to result, during transmission of the data payload segment, in a maximum current draw from the battery that is less than the peak current rating of the battery, and transmit each of the one or more data payload segments, so as to ensure that the transmission of one of the one or more data payload segments does not overlap in time with the transmission of any other one of the one or more data payload segments.

14. A non-transitory computer-readable medium having instructions stored therein, wherein the instructions, when executed by a processor, cause the processor to:

receive a data payload to be transmitted;

segment the data payload into one or more data payload segments based on a data payload size of the data payload and a peak current rating of the battery, wherein a largest of the one or more data payload segments has a segment size which is estimated to result, during transmission of the data payload segment, in a maximum current draw from the battery that is less than the peak current rating of the battery; and transmit each of the one or more data payload segments, so as to ensure that the transmission of one of the one or more data payload segments does not overlap in time with the transmission of any other one of the one or more data payload segments.

* * * * *